United States Patent [19]
Riccio

[11] Patent Number: 5,465,653
[45] Date of Patent: Nov. 14, 1995

[54] SPIT USED IN COOKING APPARATUS

[76] Inventor: Renato Riccio, 11350 Pagemill, Dallas, Tex. 75243

[21] Appl. No.: 6,501

[22] Filed: Jan. 21, 1993

Related U.S. Application Data

[62] Division of Ser. No. 942,622, Sep. 9, 1992, Pat. No. 5,361,685, which is a continuation of Ser. No. 684,576, Apr. 12, 1991, Pat. No. 5,184,540.

[51] Int. Cl.⁶ .................................................. A47J 37/04
[52] U.S. Cl. .............................. 99/421 H; 99/419; 99/446
[58] Field of Search ............... 99/339, 340, 419–421 V, 99/494, 532, 533; 30/322; 211/125; 294/49, 61; 126/41 B, 25 R

[56] References Cited

U.S. PATENT DOCUMENTS

| | | | |
|---|---|---|---|
| 417,433 | 12/1889 | Lorenz | 294/61 |
| 1,570,306 | 1/1926 | Johnson | 294/61 |
| 1,813,292 | 7/1931 | Hord | 294/61 X |
| 2,488,362 | 11/1949 | Wiur | 294/61 |
| 2,618,730 | 11/1952 | Panken | 99/421 H |
| 2,696,163 | 12/1954 | Galley | 99/421 P |
| 2,762,293 | 9/1956 | Boyjian | 99/421 P |
| 2,885,950 | 5/1959 | Stolt et al. | 99/421 H |
| 3,104,605 | 9/1963 | McKinney | 99/421 H |
| 3,125,015 | 3/1964 | Schlaegel | 99/421 P |
| 3,196,776 | 7/1965 | Norton | 99/421 P |
| 3,205,812 | 9/1965 | Booth | 99/421 P |
| 3,280,907 | 10/1966 | Hoffman | 99/419 X |
| 3,296,957 | 1/1967 | Gagnon et al. | 99/444 |
| 3,297,166 | 1/1967 | Summers | 99/421 HH |
| 3,333,529 | 8/1967 | Wilson | 99/421 P |
| 3,832,989 | 9/1974 | Belford | 126/25 R |
| 4,112,832 | 9/1978 | Severdia et al. | 99/421 HH |
| 4,214,516 | 7/1980 | Friedl et al. | 99/447 |
| 4,770,091 | 9/1988 | Vaughn | 99/421 H |
| 4,892,032 | 1/1990 | Jerome | 99/419 |
| 5,077,917 | 1/1992 | Lacey et al. | 294/49 |

FOREIGN PATENT DOCUMENTS

| | | | |
|---|---|---|---|
| 2494980 | 6/1982 | France | 99/421 R |
| 2425346 | 12/1975 | Germany | 99/421 P |
| 2522566 | 12/1976 | Germany | 99/421 R |
| 469456 | 7/1975 | U.S.S.R. | 99/421 P |
| 2083343 | 3/1982 | United Kingdom | 99/421 HH |

*Primary Examiner*—Timothy F. Simone
*Attorney, Agent, or Firm*—Harry C. Post, III

[57] ABSTRACT

Cooking apparatus that uses a housing with a fireplace to support a fire for cooking food. A spit for supporting food is rotatably connected to the housing and receives heat generated from the fire in the fireplace. The spit may include at least three driven shoulders disposed substantially equidistant from one another around the periphery of the spit. Driving apparatus is connected to the housing for rotating the spit and has a drive member rotatably connected to the housing. The driving member may include at least four driving shoulders disposed substantially equidistant from one another to engage the driven shoulders on the spit so that the spit rotates more than one complete revolution every time the drive member is rotated. The housing may include a reclamation trap disposed beneath the spit to recover the juices produced when cooking the food on the spit. The driving member may include an axle rod and elongated slats having a length sufficient to allow large food items to be mounted to the spits.

12 Claims, 3 Drawing Sheets

SPIT USED IN COOKING APPARATUS

CROSS REFERENCE TO RELATED APPLICATION

This is a division of application Ser. No. 07/942,622, filed on Sep. 9, 1992, U.S. Pat. No. 5,361,685 of RENATO RICCIO, for COOKING APPARATUS, which is a continuation of application Ser. No. 07/684,576, filed on Apr. 12, 1991, U.S. Pat. No. 5,184,540 of RENATO RICCIO, for COOKING APPARATUS.

TECHNICAL FIELD

This invention relates to cooking apparatus and more particularly to cooking apparatus using a rotisserie to cook food in restaurants, cafes, hotels and other commercial establishments having a demand for substantial quantities of cooked food.

Background Art

It is well known that food is cooked in prior art devices by using a fire and a rotisserie to cook food, such as chickens, hams, beef and fish, in such commercial establishments. These prior art devices use a housing in which a fireplace is provided and a multiplicity of spits are supported by a member that is rotated around an axle. So that the food is cooked uniformly, gears are used in these prior art devices to rotate each of the multiplicity of spits. However, since gears are costly to manufacture and maintain, this prior art cooking device is extremely expensive to make and service. Accordingly, only those commercial establishments with a large demand can justify the expense of this prior art device.

Further, fluid fuels, such as natural gas, propane gas, butane gas, oil or kerosene, are frequently used to provide a constant heat source in these prior art devices, but such fuels do not provide the flavor adding ingredients caused by solid fuels, such as provided when burning hickory wood or mesquite wood.

Further, when the food is being cooked in these prior art devices there is no apparatus so reclaim the juices that drip from the food for use in other food, such as sauces or gravies.

Further, these prior art devices use a spit that is relatively short to prevent the weight of the food from rendering the spit inoperative, which requires additional gearing to rotate the spits and increase expense of service and maintenance to keep the prior art devices in operating.

Further, the prior art devices are not able to cook oversized food such as sides of beef or pigs.

Further, the prior art devices do not make use of the fire produced in the fireplace as efficiency as desired.

Accordingly, it is an object of the present invention to provide cooking apparatus that uses a housing with a fireplace to support a fire for cooking food. A spit for supporting food is rotatably connected to the housing and receives heat generated from the fire in the fireplace. The spit may include at least three driven shoulders disposed substantially equidistant from one another around the periphery of the spit. Driving apparatus is connected to the housing for rotating the spit and has a drive member rotatably connected to the housing. The driving member may include at least four driving shoulders disposed substantially equidistant from one another to engage the driven shoulders on the spit so that the spit rotates more than one complete revolution every time the drive member is rotated.

Further, it is an object of the present invention to cooking apparatus that uses a housing, which includes a fireplace to support a fire for cooking food. A spit for supporting food is rotatably connected to the housing and disposed to receive heat generated from the fire in the fireplace. Driving apparatus is connected to the housing for rotating the spit and includes a reclamation trap disposed beneath the spit to recover the juices produced when cooking the food on the spit.

Further, it is an object of the present invention to provide cooking apparatus with fluid fuel burning apparatus for providing a fire fed by a fluid fuel in the fireplace to provide substantially constant heat to the food being cooked and solid fuel burning means for providing a fire fed by a flavor enhancing substance to provide a flavor to the food being cooked.

Further, it is an object of the present invention to provide cooking apparatus that is able to cook oversized food.

Further, it is an object of the present invention to provide cooking apparatus that make use of the fire produced in the fireplace more efficiently than prior art devices.

DISCLOSURE OF THE INVENTION

In accordance with the present invention there is provided cooking apparatus that uses a housing with a fireplace to support a fire for cooking food. A spit for supporting food is rotatably connected to the housing and receives heat generated from the fire in the fireplace. The spit may include at least three driven shoulders disposed substantially equidistant from one another around the periphery of the spit. Driving apparatus is connected to the housing for rotating the spit and has a drive member rotatably connected to the housing. The driving member may include at least four driving shoulders disposed substantially equidistant from one another to engage the driven shoulders on the spit so that the spit rotates more than one complete revolution every time the drive member is rotated.

Further, in accordance with the present invention there is provided cooking apparatus that uses a housing, which includes a fireplace to support a fire for cooking food. A spit for supporting food is rotatably connected to the housing and disposed to receive heat generated from the fire in the fireplace. Driving apparatus is connected to the housing for rotating the spit and includes a reclamation trap disposed beneath the spit to recover the juices produced when cooking the food on the spit.

Further, in accordance with the present invention there is provided cooking apparatus that has a housing, which includes a fireplace to support a fire for cooking food. First and second spits for supporting food are rotatably connected to the housing and disposed to receive heat generated from the fire in the fireplace. Driving apparatus is connected to the housing for rotating the spits. The driving apparatus includes an axle rod rotatably connected to the housing and a drive member. The drive member has a first support member rotatably connected to the housing around the axle rod and a second support member rotatably connected to the housing around the axle rod. The first and second support members have a length sufficient to permit the spits to be connected thereto by a distance away from the axle rod sufficient to allow large food items to be supported on the spits while being rotated around the axle rod.

BRIEF DESCRIPTION OF THE DRAWINGS

Other objects and advantages of the invention will become apparent upon reading the following detailed description and upon reference to the drawings, wherein like reference characters are used throughout to designate like parts.

BEST MODE FOR CARRYING OUT THE INVENTION

Figure 1:
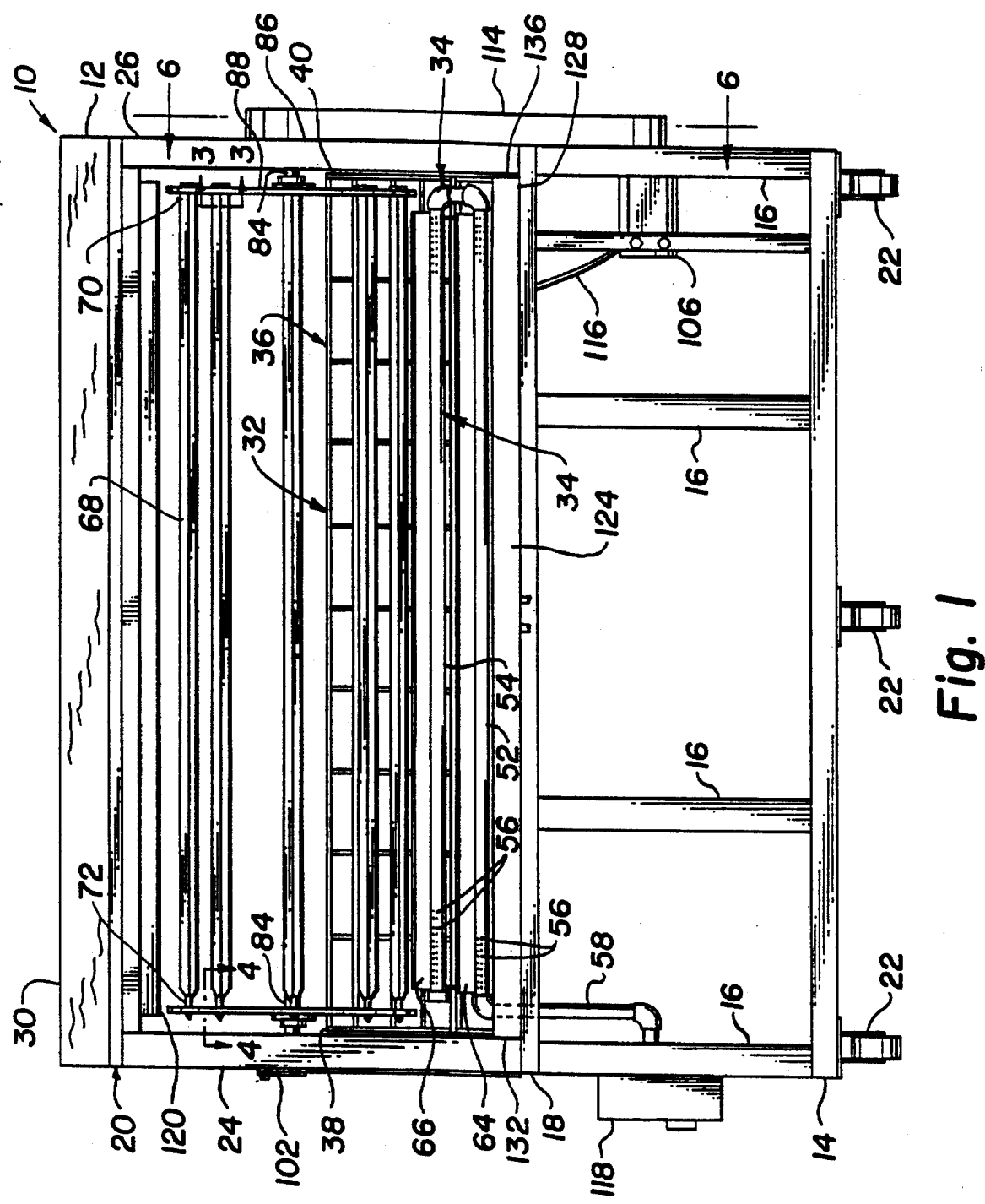
FIG. 1 is a front elevational view of cooking apparatus constructed in accordance with the present invention.
Figure 2:
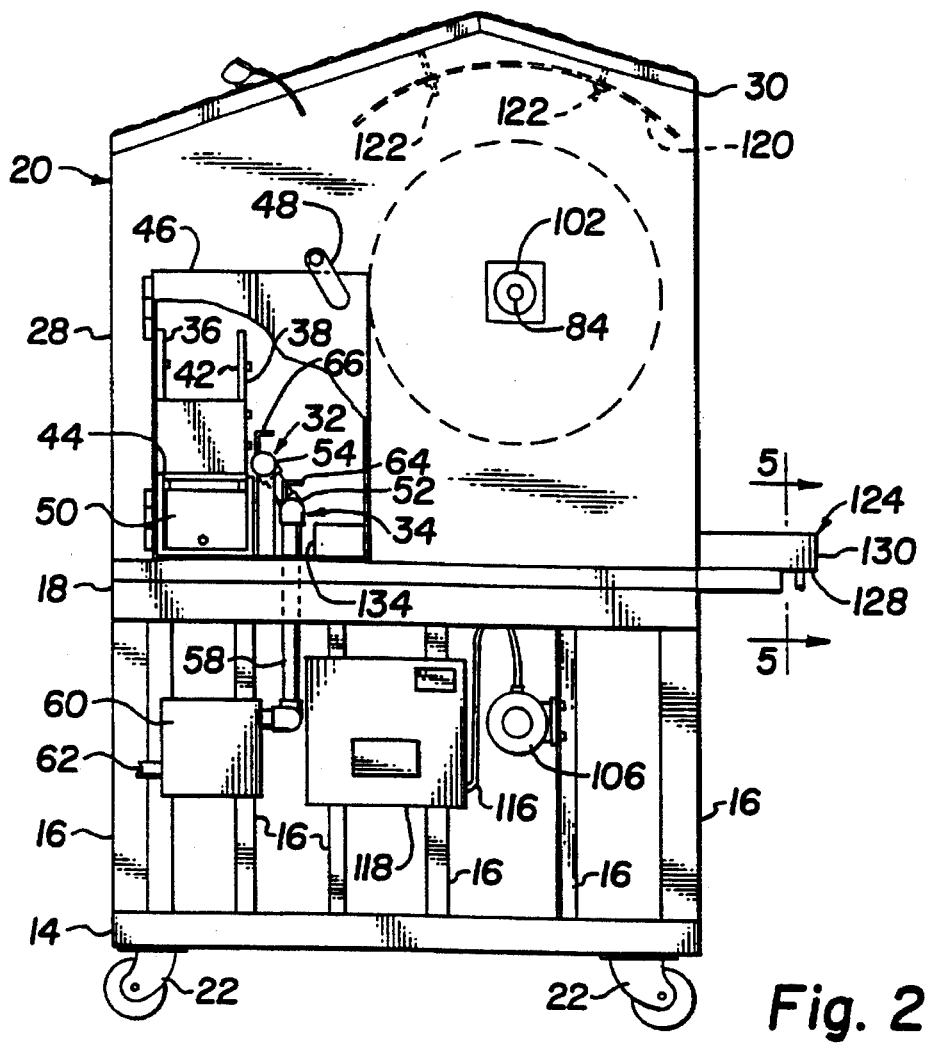
FIG. 2 is a side elevational view, partly in section, of the cooking apparatus shown in FIG. 1.

Turning now to FIGS. 1 and 2, there is shown cooking apparatus 10, which comprises a housing 12.

Housing 12 is constructed from a metal frame with a bottom 14 from which a plurality of columns 16 extend upwardly to support a shelf 18 forming the bottom of an enclosure 20. Wheels 22 are connected to bottom 14 moving housing 12 to a desired location. Enclosure 20 has a left sidewall 24, a right sidewall 26, a back 28, and a top 30, the front being open for access.

A fireplace 32 to support a fire for cooking food is provided in enclosure 20. The fire in fireplace 32 is provided by fluid fuel burning apparatus 34 and solid fuel burning means 36. Fluid, preferably gas, fuel burning apparatus 34 provides substantially constant heat to the food being cooked and solid fuel burning apparatus 36 provides a flavor enhancement to the food being cooked.

Solid fuel burning apparatus 36 is made of a metal frame extending from a first end 38 disposed adjacent to left side wall 24 to a second end 40 disposed adjacent to right side wall 26 to form an elongated lattice work, which forms an upper burning portion 42 and a lower ash collecting portion 44. To provide solid fuel burning portion 42, access is gained through left sidewall 24 by use of a door 46, which is secured by rotating latch 48 with the length of apparatus 36 extending along back wall 28. An ash box 50 complementarily received in lower ash collection portion 44 of apparatus 36 is disposed to receive ashes after the fuel is consumed by the fire.

Fluid fuel burning apparatus 34 has first and second burners 52 and 54, respectively, that extend substantially parallel to one another along and adjacent elongated solid fuel burning apparatus 36 on the side away from wall 28 of housing 12. First burner 52 is lower or nearer to shelf 18 than second burner 54 and second burner 54 is offset from first burner 52 in a direction away toward solid fuel burning apparatus 36. Each burner 52 and 54 are generally U-shaped, interconnected elongated tubular members with perforations 56 along their length to permit the fluid fuel to escape from the member and be burned. Attached to burner 52 is tubular member 58 connected into a control valve 60 enclosed in a box supported on one of columns 16 of housing 12. An inlet connection 62 is provided for direct connection to a commercial source of a fluid fuel. A first elongated angle iron 64 has one side of the angle attached to tubular member 52 and the other side of the angle facing away from back wall 28 to direct the fire away from solid fuel burning apparatus 36. A second elongated angle iron 66 has one side of the angle attached to tubular member 54 and the other side of the angle facing away from back wall 28 to direct the fire away from solid fuel burning apparatus 36.

A multiplicity of spits 68 used to support food are rotatably connected to housing 12 and disposed to receive heat generated from the fire in the fireplace formed by fluid fuel burning apparatus 34 and solid fuel burning apparatus 36.

Each spit 68 includes a body 69 having first and second ends 70 and 72, respectively.

Figure 3:
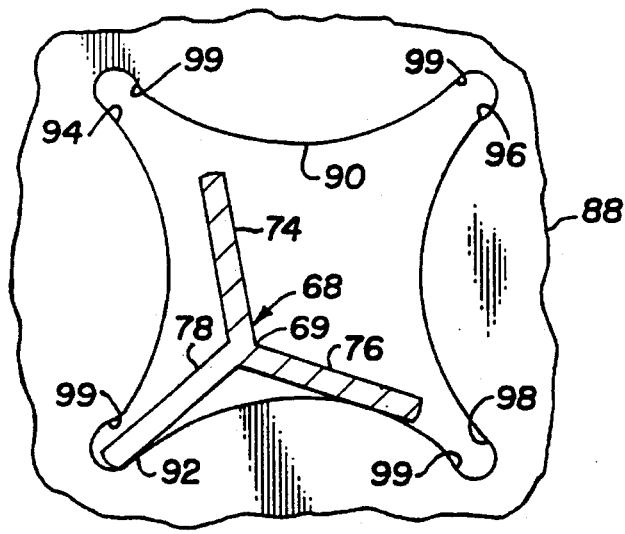
FIG. 3 is a sectional view of a portion of the invention shown in FIG. 1, taken along line 3—3 in the direction of the arrows.

As best seen in FIGS. 1 and 3, first end 70 has at least three driven shoulders 74, 76 and 78 disposed substantially equidistant from one another around the periphery of spit 68. Driven shoulders 74, 76 and 78 are formed by radially directed fins extending substantially the entire length of body 69 of spit 68 to provide stability along the length of spit 68 and allow substantial amounts of food to be connected to each spit 68 without damage to the spits when rotated.

Figure 4:
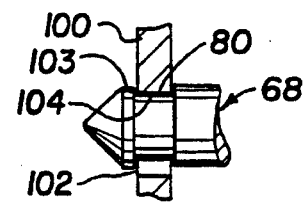
FIG. 4 is a sectional view of a portion of the invention shown in FIG. 1, taken along line 4—4 in the direction of the arrows.

As best seen in FIGS. 1 and 4, second end 72 of each spit 68 has a bearing surface 80 to support each spit 68 in a generally horizontal manner, while allowing the respective spit to rotate relative to the surface supporting the respective spit.

Also connected to housing 12 is driving apparatus 82 for rotating the multiplicity of spits 68. Driving apparatus 82 includes an axle rod 84 that is rotatably connected to housing 12, such as by bearings 86, and a drive member 88. Drive member 88 is connected to axle rod 84.

As best seen in FIG. 3, drive member 88 has a passageway 90 for each spit 68. Passageway 90 is of sufficient size to receive first end 70 of the respective spit while being sufficiently small to prevent spit 68 from bouncing out of drive member 88 when rotated around axle rod 84. Passageway 90 defines at least four driving shoulders 92, 94, 96 and 98. Each driving shoulder is gently curved to prevent the spit from bouncing as drive member 88 is rotated and is provided with a retaining shoulder 99 to assist in preventing spit 68 from rotating more that one driven shoulder at a time. Also, each driving shoulder is disposed substantially equidistant from one another and engage driven shoulders 74, 76 and 78 on the respective spit so that spit 68 rotates more than one complete revolution every time drive member 88 is rotated around axle rod 84. Although only four driving shoulders 92, 94, 96 and 98 and three driven shoulders 74, 76 and 78 are discussed and shown, it should be understood that multiples of four driving and three driven shoulders will operate equally well to rotate each spit 68 at a different rate of rotation than the rotation of axle rod 84.

As best seen in FIG. 4, a support member 100 is rotatably connected to axle rod 84, and has a passageway 102 for each spit. Each passageway 102 is of sufficient size to permit head 103 of second end 72 of the respective spit therethrough while sufficiently small to inhibit the likelihood of second end 72 from disengaging with support member 100 as support member 100 rotates around axle rod 84. Each passageway 102 includes a bearing surface 104 to engage bearing surface 80 on the respective spit so that the respective spit is permitted to rotate relative to the support member 100 when the spit is moving around axle rod 84.

Figure 6:
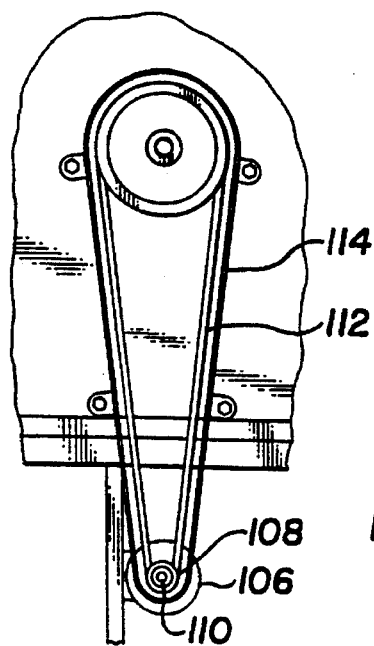
FIG. 6 is a sectional view of a portion of the invention shown in FIG. 1, taken along line 6—6 in the direction of the arrows.

As best seen in FIGS. 1, 2 and 6, to rotate drive member 88 around axle rod 84, an electric motor 106 is connected to one of the columns 16. A pulley 108 is connected to a drive shaft 110 of motor 106 and drives a drive belt 112. A pulley 114 is connected to axle rod 84 and operably engages with drive belt 112 to rotate drive member 88 and support member 100 around axle rod 84, while simultaneously rotating each spit 68 to rotate while be moved around axle rod 84. To inhibit the likelihood of injury to workers, a cover 114 is connected to housing 12. Electrical control circuitry 116 for motor 106 interconnects control box 118 to motor 106. Control box 108 includes computerized electronic control chips to selectively activate motor 106 and perform other operations for the cooking apparatus.

To assist in conserving energy, the upper portion of housing 12 may be provided with a heat reflecting device 120, as best seen in FIGS. 1 and 2. Heat reflecting device 120 is made of a heat absorbing elongated metal plate in a tubular curve to generally conform to the curve followed by the movement of spits 68. Heat reflecting device 120 is connected by members 122 threadedly engaging top 30 of housing 12 to permit adjustment of device relative to spits 68. Heat released from fireplace 32 is absorbed by device 120 and emitted on the food as it moves past device 120.

Figure 5:
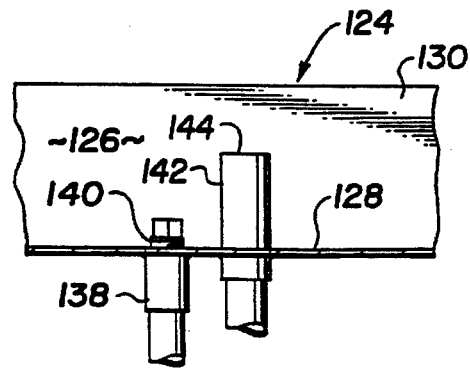
FIG. 5 is a sectional view of a portion of the invention shown in FIG. 2, taken along line 5—5 in the direction of the arrows.

As best seen in FIG. 1, 2 and 5, a reclamation trap 124 is disposed beneath the multiplicity of spit 68 to recover the juices produced when cooking the food. Reclamation trap 124 in housing 12 has a bowl 126 created by a bottom 128, sides 130, 132, 134 and 136 extending upwardly from bottom 128 by a distance sufficiently to support a quantity of water. A water drain 138 is provided with an inlet 140 at an elevation substantially the same as bottom 128 of bowl 126. A food juices drain 142 is provided with an inlet 144 at an elevation above the water level so that the juices may be drained from off of the water.

Figure 7:
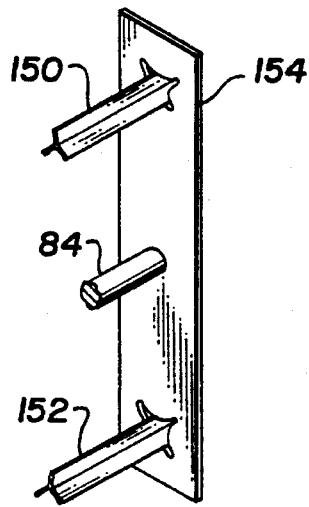
FIG. 7 is a perspective view of a modified first support member that may be used with the remaining elements of the invention shown in FIG. 1.
Figure 8:
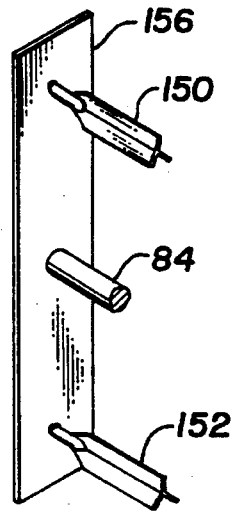
FIG. 8 is a perspective view of a modified second support member that may be used with the remaining elements of the invention shown in FIG. 1.

As best seen in FIGS. 1, 2, 7 and 8, when food having a large size, such as a side of beef or hog, is being cooked, first and second spits 150 and 152, respectively, are used. Spits 150 and 152 are constructed the same as pits 68, previously described. The main difference between this apparatus is the drive and support members of this embodiment are a first elongated slat 154 and a second elongated slat 156, respectively. The length of these slats is sufficient to allow large food items to be supported on the spits while being rotated. As shown in FIG. 7, the driving shoulders in the passageways adjacent the outer end of first slat 154 are the same as the driving shoulders on drive member 88. As shown in FIG. 8, the bearing surface in the passageways adjacent the outer end of second slat 156 are the same as the bearing surfaces on support member 100.

In operation, solid fuel burning apparatus 36 is loaded with solid fuel land fluid fuel burning apparatus 34 ignited. Water is added to bowl 126 of reclamation trap 124. Motor 106 is turned off and a spit 68 removed from driving apparatus 82. Food to be cooked is attached to spit 68 and spit 68 reconnected to driving apparatus 82. After the quantity of food desired to be cooked has been attached to the multiplicity of spits 68, motor 106 is energized and drive members 88 or 154, support members 100 or 156 and spits 68 or 150 and 152 rotated around axle rod 84 until the food is cooked. Following the cooking of this food, additional food may replace the cooked food on the spits and additional cooking take place until it is desired to discontinue cooking, at which time motor 106 and fluid fuel burning apparatus 34 are turned off.

The invention having been described, what is claimed is:

1. A spit for cooking apparatus using a rotisserie, comprising: a body having a periphery; and at least three driven shoulders disposed around the periphery of said body, the at least three driven shoulders being adapted for rotating said body in the rotisserie.

2. A spit, as set forth in claim 1, further comprising: the at least three driven shoulders on said body being disposed substantially equidistant from one another around the periphery of said body.

3. A spit for cooking apparatus using a rotisserie, comprising: a body; and at least three driven shoulders disposed around a periphery of said body, the at least three driven shoulders being adapted for rotating said body in the rotisserie, the at least three driven shoulders on said body being formed by radially directed fins extending substantially the entire length of said body to provide stability along its length.

4. A spit, as set forth in claim 1, further comprising: said body including an end having a bearing surface to support said body while being rotated.

5. A spit, as set forth in claim 4, further comprising: the at least three driven shoulders on said body being disposed substantially equidistant from one another around the periphery of said body.

6. A spit, as set forth in claim 4, further comprising: the at least three driven shoulders on said body being formed by radially directed fins extending substantially the entire length of said body to provide stability along its length.

7. A spit used in cooking apparatus, comprising: a body adapted to be used in a rotisserie having a periphery; and at least three driven shoulders disposed around the periphery of said body, said at least three driven shoulders being adapted to receive a driving force for rotating said body in said rotisserie.

8. A spit, as set forth in claim 7, further comprising: said at least three driven shoulders on said body being disposed substantially equidistant from one another around said body.

9. A spit used in cooking apparatus, comprising: a body adapted to be used in a rotisserie; and at least three driven shoulders disposed around said body, said at least three driven shoulders being adapted to receive a driving force for rotating said body in said rotisserie, said at least three driven shoulders on said body being formed by radially directed fins extending substantially the entire length of said body to provide stability along its length.

10. A spit, as set forth in claim 7, further comprising: said body including an end having a bearing surface to support said body while being rotated.

11. A spit, as set forth in claim 10, further comprising: said at least three driven shoulders being disposed substantially equidistant from one another around said body.

12. A spit, as set forth in claim 10, further comprising: said at least three driven shoulders on said body being formed by radially directed fins extending substantially the entire length of said body to provide stability along its length.

\* \* \* \* \*